(12) United States Patent
Maeda et al.

(10) Patent No.: US 10,577,483 B2
(45) Date of Patent: Mar. 3, 2020

(54) CLARIFYING AGENT COMPOSITION, RESIN COMPOSITION AND MOLDED ARTICLE

(71) Applicant: ADEKA CORPORATION, Tokyo (JP)

(72) Inventors: Takuya Maeda, Saitama (JP); Atsushi Sakai, Saitama (JP); Naoko Tanji, Saitama (JP); Naoshi Kawamoto, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 374 days.

(21) Appl. No.: 14/400,276

(22) PCT Filed: May 7, 2013

(86) PCT No.: PCT/JP2013/062859
§ 371 (c)(1),
(2) Date: Nov. 10, 2014

(87) PCT Pub. No.: WO2013/168717
PCT Pub. Date: Nov. 14, 2013

(65) Prior Publication Data
US 2015/0096918 A1    Apr. 9, 2015

(30) Foreign Application Priority Data

May 11, 2012 (JP) ................................ 2012-109253
May 11, 2012 (JP) ................................ 2012-109254

(51) Int. Cl.
*B65D 1/02* (2006.01)
*C08K 5/527* (2006.01)
*C08L 23/16* (2006.01)
*C08K 5/00* (2006.01)
*C08K 5/098* (2006.01)

(52) U.S. Cl.
CPC ............ *C08K 5/527* (2013.01); *B65D 1/0207* (2013.01); *C08K 5/0041* (2013.01); *C08K 5/0083* (2013.01); *C08L 23/16* (2013.01); *C08K 5/098* (2013.01)

(58) Field of Classification Search
CPC ........ C08L 23/00; C08L 23/02; C08L 23/025; C08L 23/04; C08L 23/06; C08L 23/08; C08L 23/0807; C08L 23/0815; C08L 23/0823; C08L 23/10; C08L 23/12; C08L 23/14; C08L 23/142; C08L 23/145; C08L 23/147; C08L 23/16; C08L 23/18; C08L 23/20; C08L 23/24; C08J 3/226; C08J 2323/00; C08J 2323/02; C08J 2323/025; C08J 2323/04; C08J 2323/06; C08J 2323/08; C08J 2323/0807; C08J 2323/0815; C08J 2323/0823; C08J 2323/10; C08J 2323/12; C08J 2323/14; C08J 2323/142; C08J 2323/145; C08J 2323/147; C08J 2323/16; C08J 2323/18; C08J 2323/20; C08J 2323/24; C08J 2423/00; C08J 2423/02; C08J 2423/04; C08J 2423/06; C08J 2423/08; C08J 2423/10; C08J 2423/12; C08J 2423/14; C08J 2423/16; C08J 2423/18; C08J 2423/20; C08K 5/0083; C08K 5/527
USPC .............. 524/108, 124, 141, 394, 543, 582; 106/503, 505, 506
See application file for complete search history.

(56) References Cited

U.S. PATENT DOCUMENTS

| 5,653,693 A | 8/1997 | Miwa et al. |
| 2004/0088245 A1 | 5/2004 | Narayan et al. |

(Continued)

FOREIGN PATENT DOCUMENTS

| EP | 2 524 944 A1 | 11/2012 |
| JP | 5-222078 A | 8/1993 |

(Continued)

OTHER PUBLICATIONS

International Search Report (Form PCT/ISA/210) for International Application No. PCT/JP2013/062859, dated Aug. 13, 2013.

(Continued)

*Primary Examiner* — Lee E Sanderson
(74) *Attorney, Agent, or Firm* — Birch, Stewart, Kolasch & Birch, LLP

(57) ABSTRACT

Provided is a clarifying agent composition which is capable of yielding a molded article having excellent transparency whose initial coloration is suppressed. The clarifying agent composition is characterized by comprising 1.0 to 10 parts by mass of a colorant with respect to 100 parts by mass of a clarifying agent represented by the following Formula (1):

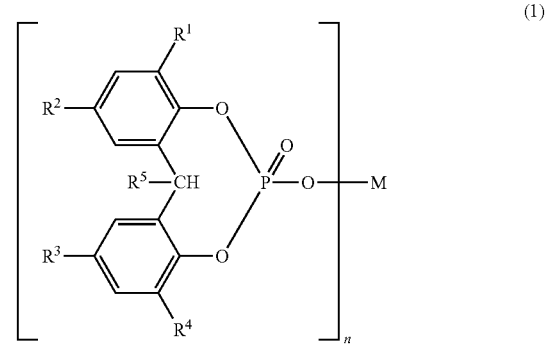

(wherein, $R^1$ to $R^4$ each independently represent a hydrogen atom or an alkyl group having 1 to 9 carbon atoms; $R^5$ represents a hydrogen atom or a methyl group; n represents 1 or 2; and M represents an alkali metal when n is 1, or Al(OH) when n is 2).

6 Claims, No Drawings

(56) References Cited

U.S. PATENT DOCUMENTS

| | | | |
|---|---|---|---|
| 2007/0185247 A1* | 8/2007 | Danielson | C08K 5/1575 524/109 |
| 2008/0038500 A1* | 2/2008 | Page | B29C 49/6418 428/36.92 |
| 2008/0227901 A1* | 9/2008 | Lefevre | B82Y 30/00 524/423 |
| 2010/0015378 A1 | 1/2010 | Takeuchi et al. | |
| 2011/0218279 A1* | 9/2011 | Urushihara | C08K 5/0083 524/141 |
| 2012/0190780 A1* | 7/2012 | Danielson | C08K 5/20 524/108 |
| 2012/0316272 A1* | 12/2012 | Danielson | C08K 5/1575 524/108 |
| 2014/0088227 A1 | 3/2014 | Guerani et al. | |

FOREIGN PATENT DOCUMENTS

| | | |
|---|---|---|
| JP | 9-77925 A | 3/1997 |
| JP | 11-140247 A | 5/1999 |
| JP | 2000-302986 A | 10/2000 |
| JP | 2000302986 A * | 10/2000 |
| JP | 2001-522918 A | 11/2001 |
| JP | 2004-346122 A | 12/2004 |
| JP | 2006-225576 A | 8/2006 |
| JP | 2008-81172 A | 4/2008 |
| JP | 2009-526123 A | 7/2009 |
| JP | 2010053248 A * | 3/2010 |
| JP | 2010-184990 A | 8/2010 |
| JP | 2011-21048 A | 2/2011 |
| JP | 2011-74202 A | 4/2011 |
| JP | 2012-152933 A | 8/2012 |
| WO | WO 99/24503 A1 | 5/1999 |
| WO | WO 2007/033297 A1 | 3/2007 |
| WO | WO 2012/102805 A1 | 8/2012 |

OTHER PUBLICATIONS

Extended European Search Report, dated Dec. 23, 2015, for European Application No. 13787347.7.

* cited by examiner

CLARIFYING AGENT COMPOSITION, RESIN COMPOSITION AND MOLDED ARTICLE

TECHNICAL FIELD

The present invention relates to a clarifying agent composition useful for molded article applications where transparency is important; a resin composition; and a molded article thereof.

The present invention also relates to a method of producing a transparent material having excellent transparency; and a plastic bottle obtained by the production method.

BACKGROUND ART

It is known that polyolefins have excellent moldability, rigidity, hygienic properties and impact resistance and that an addition of a clarifying agent thereto reduces the opacity of the resulting molded article and thus improves the transparency; therefore, polyolefins are used in a variety of applications such as food containers, beverage containers, protective sheets and wrapping materials.

Generally speaking, consumers tend to prefer highly transparent products in many applications. In the case of storage containers where consumers desire to see the container contents, the more transparent the container is, the greater becomes the appealing power of the product and the higher can be the asking price thereof in the storage container market.

However, even if individual molded article is colorless and transparent, for example, when water is filled therein, the background of the molded article is distorted and there is thus a problem of insufficient transparency.

Further, in order to impart a molded article with functions such as heat resistance and weather resistance, additives such as an antioxidant, an acid removing agent, a slip agent, a brightening agent, an ultraviolet absorber and a hindered amine compound are blended; however, since addition of these additives may cause the resulting molded article to be colored, an improvement is demanded in this respect.

For example, in Patent Document 1, for the purpose of improving the transparency of a molded article, a composition in which 50 to 10,000 parts of a water-insoluble colorant is added to 1,000,000 parts of a clarifying agent is disclosed. In addition, Patent Document 2 discloses a polymer composition in which a polymeric nucleating agent, a propylene polymer and a color pigment are blended.

Meanwhile, in polymers such as polyolefins, it is known that their molecules are each in the form of a nano-sized string. In an amorphous state, these polymer molecules have no bending directionality and thus serve as a homogeneous medium for light as well; however, when the polymer is molded by injection molding or the like, the polymer molecules assume an oriented state. In such an oriented state, a birefringence phenomenon appears due to the difference between the refractive index ($n_{//}$) for light linearly polarized in the orientation direction and the refractive index ($n_{\perp}$) for light linearly polarized in the direction perpendicular to the orientation direction. Particularly, when a plastic bottle such as a beverage container is filled with water, this birefringence phenomenon is prominent and the transparency of the plastic bottle is impaired in some cases.

Further, in the case of plastic bottles where a material through which the product contents are visible is demanded, even if the plastic bottles are themselves transparent, there is a problem that they do not appear transparent when put on store-front display.

As a method improving the transparency of an olefin molded article, a variety of methods have been examined and, for example, Patent Document 1 and 2 disclose polypropylene-based resin films for surface protection which comprise a nucleating agent in an amount of 100 ppm or less and have a birefringence ($\Delta n$) of $0.4 \times 10^{-3}$ to $2.5 \times 10^{-3}$.

RELATED ART DOCUMENTS

Patent Documents

Patent Document 1: Japanese Translated PCT Patent Application Laid-open No. 2009-526123

Patent Document 2: Japanese Translated PCT Patent Application Laid-open No. 2001-522918

Patent Document 3: Japanese Unexamined Patent Application Publication No. 2010-184990

Patent Document 4: Japanese Unexamined Patent Application Publication No. 2011-74202

SUMMARY OF THE INVENTION

Problems to be Solved by the Invention

However, in Patent Document 1, when the composition is blended with additives such as antioxidant and ultraviolet absorber and molded, there is a problem that the outer appearance of the resulting molded article is deteriorated due to coloration. In addition, when the polymer composition of Patent Document 2 is molded into a bottle container, the bottle container does not have satisfactory transparency; therefore, a further improvement is demanded.

Moreover, in Patent Documents 3 and 4, the blended amount of the nucleating agent is not sufficient and it is thus difficult to obtain a thick transparent molded article such as a plastic bottle.

In view of the above, an object of the present invention is to provide a clarifying agent composition which solves the above-described problems of prior art and is capable of yielding a molded article having excellent transparency whose initial coloration is suppressed. In addition, other objects of the present invention are to provide a method of producing a transparent material having excellent transparency and to provide a plastic bottle obtained by the production method.

Means for Solving the Problems

The present inventors intensively studied the above-described problems to discover that the above-described object of the present invention can be achieved by incorporating a specific clarifying agent and a colorant, thereby completing the present invention.

That is, the clarifying agent composition of the present invention is characterized by comprising 1.0 to 10 parts by mass of a colorant with respect to 100 parts by mass of a clarifying agent represented by the following Formula (1):

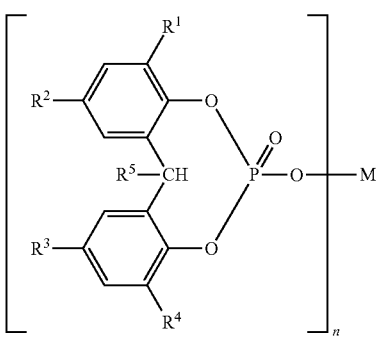

(1)

(wherein, $R^1$ to $R^4$ each independently represent a hydrogen atom or an alkyl group having 1 to 9 carbon atoms; $R^5$ represents a hydrogen atom or a methyl group; n represents 1 or 2; and M represents an alkali metal when n is 1, or Al(OH) when n is 2).

In the clarifying agent composition of the present invention, it is preferred that the colorant be a blue pigment.

In the clarifying agent composition of the present invention, a fatty acid metal salt or a filler is preferably blended.

The resin composition of the present invention is characterized by comprising 0.04 to 10 parts by mass of the above-described clarifying agent composition with respect to 100 parts by mass of a polyolefin resin.

Further, the resin composition of the present invention is characterized by comprising: 0.04 to 10 parts by mass of a clarifying agent represented by the following Formula (1) with respect to 100 parts by mass of a polyolefin resin; and 1.0 to 10 parts by mass of a colorant with respect to 100 parts by mass of the clarifying agent:

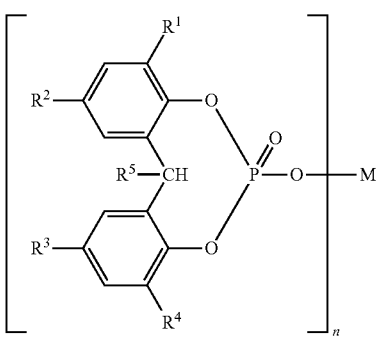

(1)

(wherein, $R^1$ to $R^4$ each independently represent a hydrogen atom or an alkyl group having 1 to 9 carbon atoms; $R^5$ represents a hydrogen atom or a methyl group; n represents 1 or 2; and M represents an alkali metal when n is 1, or Al(OH) when n is 2).

The molded article according to the present invention is obtained by molding the above-described resin composition.

The present inventors also discovered that the above-described other objects of the present invention can be achieved by using a polyolefin resin composition in which a specific clarifying agent is blended at a specific ratio with respect to a polyolefin resin so as to control the optical properties of the resulting molded article within a specific range, thereby completing the present invention.

That is, the method of producing a transparent material according to the present invention is characterized by comprising the step of molding a polyolefin resin composition that has a birefringence ($\Delta n$) in the range of $5.0 \times 10^{-3}$ to $6.0 \times 10^{-3}$ when molded into a 0.5 mm-thick sheet, wherein the polyolefin resin composition comprises 0.01 to 0.5 parts by mass of a clarifying agent represented by the following Formula (1) with respect to 100 parts by mass of a polyolefin resin:

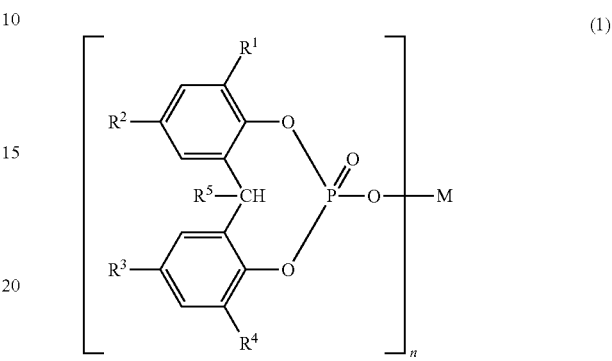

(1)

(wherein, $R^1$ to $R^4$ each independently represent a hydrogen atom or an alkyl group having 1 to 9 carbon atoms; $R^5$ represents a hydrogen atom or a methyl group; n represents 1 or 2; and M represents an alkali metal when n is 1, or Al(OH) when n is 2)

In the production method of the present invention, as the above-described polyolefin resin, an ethylene-propylene random copolymer having a melt flow rate of 0.1 to 30 g/10 min is preferably used.

In the production method of the present invention, it is preferred that the above-described polyolefin resin composition further contain a fatty acid metal salt or a filler.

The plastic bottle of the present invention is characterized by being produced by the above-described method of producing a transparent material.

The plastic bottle of the present invention is preferably used as a beverage container.

Effects of the Invention

According to the present invention, a clarifying agent composition which is capable of yielding a molded article having excellent transparency whose initial coloration is suppressed; and a resin composition comprising the clarifying agent composition can be obtained.

Further, by the production method of the present invention, a molded article having excellent transparency can be obtained, and the molded article can be suitably used as a plastic bottle, particularly as a beverage container.

MODE FOR CARRYING OUT THE INVENTION

[Clarifying Agent Composition]

First, the clarifying agent composition of the present invention will be described below in detail.

The clarifying agent composition of the present invention comprises 1.0 to 10 parts by mass of a colorant with respect to 100 parts by mass of a clarifying agent represented by the following Formula (1):

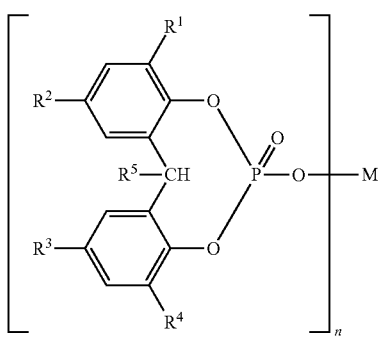

(1)

(wherein, $R^1$ to $R^4$ each independently represent a hydrogen atom or an alkyl group having 1 to 9 carbon atoms; $R^5$ represents a hydrogen atom or a methyl group; n represents 1 or 2; and M represents an alkali metal when n is 1, or Al(OH) when n is 2).

In the clarifying agent composition of the present invention, a colorant is used within the range of 1.0 to 10 parts by mass with respect to 100 parts by mass of a clarifying agent. When the amount of the colorant is less than 1.0 part by mass, the outer appearance of the resulting molded article may be deteriorated due to coloration or the like, while when the amount exceeds 10 parts by mass, coloration is strong and the transparency may thus be impaired. The colorant is preferably used in the range of 1.3 to 2.0 parts by mass with respect to 100 parts by mass of a clarifying agent.

Examples of the alkyl group having 1 to 9 carbon atoms which is represented by $R^1$, $R^2$, $R^3$ and $R^4$ in the above-described Formula (1) include a methyl group, an ethyl group, a propyl group, an isopropyl group, a butyl group, a sec-butyl group, a tert-butyl group, an isobutyl group, an amyl group, an isoamyl group, a tert-amyl group, a hexyl group, a cyclohexyl group, a heptyl group, an isoheptyl group and a tert-heptyl group. Thereamong, the alkyl group having 1 to 9 carbon atoms is particularly preferably a t-butyl group.

Examples of the alkali metal represented by M in the above-described Formula (1) include lithium, sodium and potassium, and a compound in which the alkali metal is lithium is particularly preferably used.

Examples of the clarifying agent that can be used in the present invention include the below-described compounds. However, the present invention is not restricted by the following compounds.

P-1

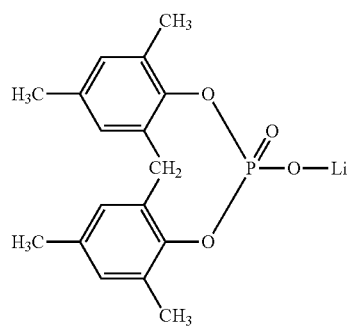

P-2

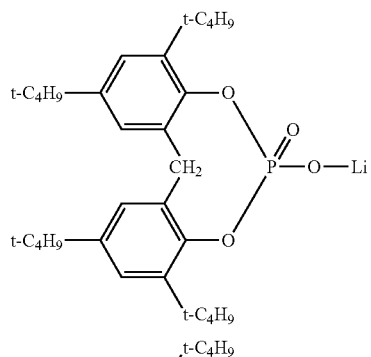

P-3

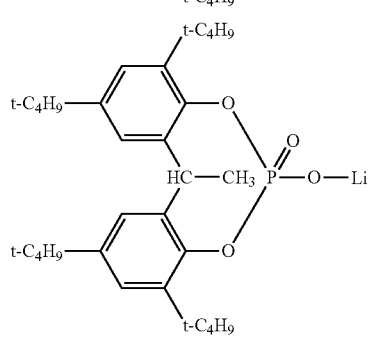

P-4

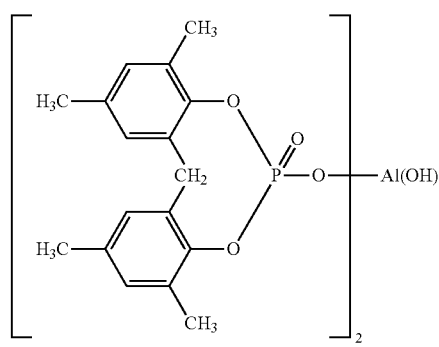

P-5

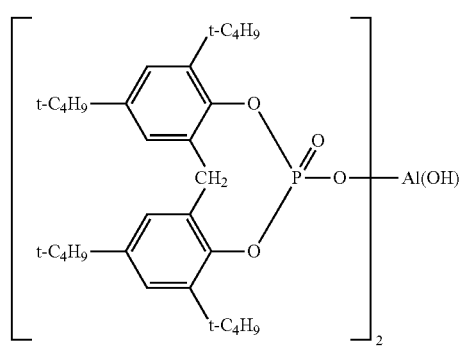

P-6

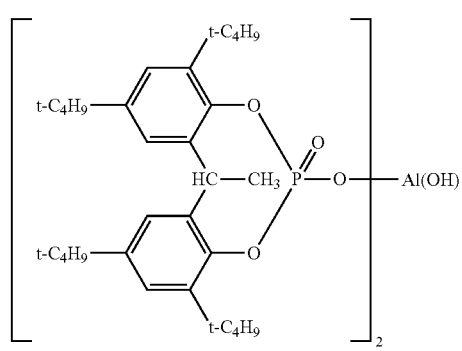

As the above-described colorant, a known compound can be used without any particular restriction; however, a blue colorant is preferably used. Examples of the blue colorant include inorganic materials, such as azurite blue, iron blue, cobalt blue, cerulean blue, inorganic synthetic ultramarine, Prussian blue, and the like; and organic materials such as phthalocyanine-based pigments (e.g., phthalocyanine blue), indanthrene blue, alkali blue lake, and the like.

In the clarifying agent composition of the present invention, in order to improve the dispersion of the colorant, a dispersant such as a metallic soap or polyethylene wax can be used. Examples of the metallic soap include magnesium palmitate, calcium oleate, copper oleate, lithium stearate, magnesium stearate, zinc stearate and calcium stearate. Further, as polyethylene wax, a variety of polyethylene waxes such as general polymerized-type, decomposed-type and modified-type polyethylene waxes can be used. Such dispersant of the colorant is preferably used in the range of 15 to 900 parts by mass with respect to 100 parts by mass of the colorant.

As the above-described colorant, a colorant coated with amorphous silica, a low-melting-point glass, or a hydroxide, oxide, carbonate, phosphate, silicate or the like of magnesium, calcium, zinc, aluminum, titanium, zirconium, tin, iron or rare earth element such as lanthanum, praseodymium or neodymium can also be used.

Moreover, by using a pigment that is commonly used for coloring conventional plastics, for example, an inorganic pigment such as zinc oxide or titanium oxide or an organic pigment such as a quinacridone-based pigment or dioxazine-based pigment, a molded article produced from the resin composition of the present invention can be adjusted to have a desired color.

In the clarifying agent composition of the present invention, a fatty acid metal salt, particularly a fatty acid lithium salt, a fatty acid magnesium salt, a fatty acid calcium salt or a fatty acid sodium salt can be preferably used in combination because this allows the effects of the present invention to be prominently exhibited. In cases where the above-described fatty acid metal salt is added as a dispersant of the clarifying agent, the fatty acid metal salt is preferably used in the range of 1 to 100 parts by mass with respect to 100 parts by mass of the clarifying agent.

Further, it is preferred that the clarifying agent composition of the present invention contain a filler. By using a filler in combination, the physical properties of the resulting molded article can be improved. As the filler, a known compound can be used without any particular restriction, and examples of preferred filler include talc, mica, calcium carbonate, calcium oxide, calcium hydroxide, magnesium carbonate, magnesium hydroxide, magnesium oxide, magnesium sulfate, aluminum hydroxide, barium sulfate, glass powders, glass fibers, clays, dolomite, silica, alumina, potassium titanate whiskers, wollastonite and fibrous magnesium oxysulfate. Among these fillers, those having an average particle size (in the case of spherical or plate-form fillers) or an average fiber diameter (in the case of needle-form or fibrous fillers) of 5 μM or less are preferred.

Next, the resin composition of the present invention will be described below in detail.

Examples of polyolefin resin that can be used in the resin composition of the present invention include α-olefin polymers such as low-density polyethylenes, linear low-density polyethylenes, high-density polyethylenes, isotactic polypropylenes, syndiotactic polypropylenes, hemi-isotactic polypropylenes, cycloolefin polymers, stereo block polypropylenes, poly-3-methyl-1-butene, poly-3-methyl-1-pentene and poly-4-methyl-1-pentene; and α-olefin copolymers such as ethylene/propylene block or random copolymers.

As the polyolefin resin, a mixture of a propylene-based polymer, such as polypropylene, ethylene/propylene block or random copolymer or non-ethylene α-olefin/propylene block or random copolymer, and other α-olefin polymer, can also be used.

The resin composition of the present invention may further contain, as required, other conventionally known additive(s), as long as the amount thereof is in such a range that does not impair the effects of the present invention.

Examples of other additives include a phenolic antioxidant, a phosphorus-based antioxidant, a thioether-based antioxidant, an ultraviolet absorber, a heavy metal inactivator, a flame retardant, a metallic soap, hydrotalcite, a filler, a lubricant, an antistatic agent, a pigment, a dye and a plasticizer.

Examples of the above-described phenolic antioxidant include 2,6-di-t-butyl-4-ethylphenol, 2-t-butyl-4,6-dimethylphenol, styrenated phenol, 2,2'-methylene-bis(4-ethyl-6-t-butylphenol), 2,2'-thiobis-(6-t-butyl-4-methylphenol), 2,2'-thiodiethylene-bis[3-(3,5-di-t-butyl-4-hydroxyphenyl) propionate], 2-methyl-4,6-bis(octylsulfanylmethyl)phenol, 2,2'-isobutylidene-bis(4,6-dimethylphenol), iso-octyl-3-(3,5-di-t-butyl-4-hydroxyphenyl)propionate, N,N'-hexane-1,6-diylbis[3-(3,5-di-t-butyl-4-hydroxyphenyl)propionamide, 2,2'-oxamide-bis[ethyl-3-(3,5-di-t-butyl-4-hydroxyphenyl) propionate], 2-ethylhexyl-3-(3',5'-di-t-butyl-4'-hydroxyphenyl)propionate, 2,2'-ethylene-bis(4,6-di-t-butylphenol), 3,5-bis(1,1-dimethylethyl)-4-hydroxy-benzenepropanoate, C13-15 alkyl esters, 2,5-di-t-amylhydroquinone, hindered phenol polymer (AO.OH998, manufactured by ADEKA Palmarole SAS), 2,2'-methylene-bis[6-(1-methylcyclohexyl)-p-cresol], 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 6-[3-(3-t-butyl-4-hydroxy-5-methyl)propoxy]-2,4,8,10-tetra-t-butylbenzo[d,f][1,3,2]-dioxaphosphepin, hexamethylene-bis[3-(3,5-di-t-butyl-4-hydroxyphenyl)propionate, calcium bis[monoethyl(3,5-di-t-butyl-4-hydroxybenzyl)phosphonate, a reaction product between 5,7-bis(1,1-dimethylethyl)-3-hydroxy-2(3H)-benzofuranone and o-xylene, 2,6-di-t-butyl-4-(4,6-bis(octylthio)-1,3,5-triazine-2-ylamino)phenol, DL-α-tocophenol (vitamin E), 2,6-bis(α-methylbenzyl)-4-methylphenol, bis[3,3-bis-(4'-hydroxy-3'-t-butyl-phenyl)butyric acid]glycol ester, 2,6-di-t-butyl-p-cresol, 2,6-diphenyl-4-octadecyloxyphenol, stearyl(3,5-di-t-butyl-4-hydroxyphenyl)propionate, distearyl(3,5-di-t-butyl-4-hydroxybenzyl)phosphonate, tridecyl-3,5-di-t-butyl-4-hydroxybenzyl thioacetate, thiodiethylene-bis[(3,5-di-t-butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylene-bis(4-methyl-6-t-butylphenol), bis[3,3-bis(4-hydroxy-3-t-butylphenyl) butyric acid]glycol ester, 4,4'-butylidene-bis(2,6-di-t-butylphenol), 4,4'-butylidene-bis(6-t-butyl-3-methylphenol), 2,2'-ethylidene-bis(4,6-di-t-butylphenol), 1,1,3-tris(2-methyl-4-hydroxy-5-t-butylphenyl)butane, bis [2-t-butyl-4-methyl-6-(2-hydroxy-3-t-butyl-5-methylbenzyl)phenyl]terephthalate, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, 1,3,5-tris [(3,5-di-t-butyl-4-hydroxyphenyl)propionyloxyethyl] isocyanurate, tetrakis[methylene-3-(3',5'-di-t-butyl-4'-hydroxyphenyl)propionate]methane, 2-t-butyl-4-methyl-6-(2-acryloyloxy-3-t-butyl-5-methylbenzyl)phenol, 3,9-bis[2-

(3-t-butyl-4-hydroxy-5-methylhydrocinnamoyloxy)-1,1-dimethylethyl]-2,4,8,10-tetraoxaspiro[5.5]undecane and triethylene glycol-bis[β-(3-t-butyl-4-hydroxy-5-methylphenyl)propionate], as well as 3-(3,5-dialkyl-4-hydroxyphenyl) propionic acid derivatives such as stearyl-3-(3,5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl)propionic acid amide and lauryl-3-(3,5-di-tert-butyl-4-hydroxyphenyl) propionic acid amide.

Examples of the above-described phosphorus-based antioxidant include triphenyl phosphite, diisooctyl phosphite, heptakis triphosphite, triisodecyl phosphite, diphenyl isooctyl phosphite, diisooctyl phenyl phosphite, diphenyl tridecyl phosphite, triisooctyl phosphite, trilauryl phosphite, diphenyl phosphite, tris(dipropylene glycol)phosphite, diisodecyl pentaerythritol diphosphite, dioleyl hydrogen phosphite, trilauryl trithiophosphite, bis(tridecyl)phosphite, tris(isodecyl) phosphite, tris(tridecyl)phosphite, diphenyldecyl phosphite, dinonylphenyl-bis(nonylphenyl)phosphite, poly(dipropylene glycol)phenyl phosphite, tetraphenyldipropyl glycol diphosphite, trisnonylphenyl phosphite, tris(2,4-di-t-butylphenyl)phosphite, tris(2,4-di-t-butyl-5-methylphenyl)phosphite, tris[2-t-butyl-4-(3-t-butyl-4-hydroxy-5-methylphenylthio)-5-methylphenyl]phosphite, tridecyl phosphite, octyldiphenyl phosphite, di(decyl)monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl)pentaerythritol diphosphite, bis(2,4-di-t-butylphenyl)pentaerythritol diphosphite, bis(2,6-di-t-butyl-4-methylphenyl)pentaerythritol diphosphite, bis(2,4,6-tri-t-butylphenyl)pentaerythritol diphosphite, bis(2,4-dicumylphenyl)pentaerythritol diphosphite, tetraphenyl-tetra(tridecyl)pentaerythritol tetraphosphite, bis(2,4-di-t-butyl-6-methylphenyl)ethyl phosphite, tetra(tridecyl) isopropylidene diphenol diphosphite, tetra(tridecyl)-4,4'-n-butylidene-bis(2-t-butyl-5-methylphenol)diphosphite, hexa(tridecyl)-1,1,3-tris(2-methyl-4-hydroxy-5-t-butylphenyl) butane triphosphite, tetrakis(2,4-di-t-butylphenyl) biphenylene diphosphonite, 9,10-dihydro-9-oxa-10-phosphaphenanthrene-10-oxide, (1-methyl-1-propanyl-3-ylidene)-tris(2-1,1-dimethylethyl)-5-methyl-4,1-phenylene) hexatridecyl phosphite, 2,2'-methylene-bis(4,6-t-butylphenyl)-2-ethylhexyl phosphite, 2,2'-methylene-bis(4,6-di-t-butylphenyl)-octadecyl phosphite, 2,2'-ethylidene-bis(4,6-di-t-butylphenyl) fluorophosphite, 4,4'-butylidene-bis(3-methyl-6-t-butylphenylditridecyl)phosphite, tris(2-[(2,4,8,10-tetrakis-t-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5]undecane, 2,4,6-tri-t-butylphenyl-2-butyl-2-ethyl-1,3-propanediol phosphite, poly-4,4'-isopropylidene diphenol C12-15 alcohol phosphite, and phosphite of 2-ethyl-2-butylpropylene glycol and 2,4,6-tri-t-butylphenol.

Examples of the above-described thioether-based antioxidant include tetrakis[methylene-3-(laurylthio)propionate] methane, bis(methyl-4-[3-n-alkyl(C12/C14)thiopropionyloxy]-5-t-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-t-butyl-m-cresol), 2,2'-thiobis(6-t-butyl-p-cresol) and distearyl disulfide.

Examples of the above-described ultraviolet absorber include 2-hydroxybenzophenones such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-t-octyl-6-benzotriazolylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl] benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl] benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy) benzoate, hexadecyl(3,5-di-tert-butyl-4-hydroxy)benzoate, octadecyl(3,5-di-tert-butyl-4-hydroxy)benzoate and behenyl (3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and various metal salts and metal chelates, particularly salts and chelates of nickel and chromium.

Examples of the above-described flame retardant include aromatic phosphates such as triphenyl phosphate, tricresyl phosphate, trixylenyl phosphate, cresyldiphenyl phosphate, cresyl-2,6-xylenyl phosphate and resorcinol-bis(diphenylphosphate); phosphonates such as divinyl phenylphosphonate, diallyl phenylphosphonate and (1-butenyl)phenylphosphonate; phosphinates such as phenyl diphenylphosphinate, methyl diphenylphosphinate and 9,10-dihydro-9-oxa-10-phosphaphenanthlene-10-oxide derivatives; phosphazene compounds such as bis(2-allylphenoxy)phosphazene and dicresylphosphazene; phosphorus-based flame retardants such as melamine phosphate, melamine pyrophosphate, melamine polyphosphate, melam polyphosphate, ammonium polyphosphate, phosphorus-containing vinylbenzyl compounds and red phosphorus; metal hydroxides such as magnesium hydroxide and aluminum hydroxide; and bromine-based flame retardants such as brominated bisphenol A-type epoxy resin, brominated phenol novolac-type epoxy resin, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate and brominated styrene.

Examples of the above-described filler include the same ones as those exemplified above.

The above-described lubricant is added for the purposes of imparting the surface of the resulting molded article with lubricity and improving the damage-preventing effect. Examples of such a lubricant include unsaturated fatty acid amides such as oleic acid amide and erucic acid amide; and saturated fatty acid amides such as behenic acid amide and stearic acid amide. These lubricants may be used individually, or two or more thereof may be used in combination.

The above-described antistatic agent is added for the purposes of reducing the electrostaticity of the resulting molded article and preventing adhesion of dusts caused by electrostatic charge. Examples of such antistatic agent include cationic, anionic and non-ionic antistatic agents. Preferred examples thereof include polyoxyethylene alkylamines and polyoxyethylene alkylamides. These antistatic agents may be used individually, or two or more thereof may be used in combination.

The amount of the respective additives to be used in the present invention is preferably in the range of from an amount at which the effects of adding the additive are exerted to an amount at which an improvement in the effects of the addition is no longer observed. Preferred amounts of the respective additives to be used with respect to 100 parts by mass of polyolefin resin are as follows: 0.1 to 20 parts by mass of plasticizer, 1 to 50 parts by mass of filler, 0.001 to 1 part by mass of surface treatment agent, 0.001 to 10 parts by mass of phenolic antioxidant, 0.001 to 10 parts by mass of phosphorus-based antioxidant, 0.001 to 10 parts by mass of thioether-based antioxidant, 0.001 to 5 parts by mass of ultraviolet absorber, 0.01 to 1 part by mass of hindered amine compound, 1 to 50 parts by mass of flame retardant, 0.03 to 2 parts by mass of lubricant, and 0.03 to 2 parts by mass of antistatic agent.

The resin composition of the present invention can be molded by a known molding method such as extrusion molding, injection molding, hollow molding, blow molding or compression molding, and molded articles, such as food containers; cosmetic and clothing containers; bottles such as food bottles, beverage bottles, cooking oil bottles and seasoning bottles; packaging materials such as food packaging materials, wrapping materials and transport packaging materials; sheets and films; fibers; miscellaneous daily goods; and toys, can be thereby easily obtained. Further, the resin composition of the present invention may also be blended with glass fibers, carbon fibers and the like to produce fiber-reinforced plastics.

[Method of Producing Transparent Material]

The method of producing a transparent material according to the present invention is characterized by comprising the step of molding a polyolefin resin composition that comprises 0.01 to 0.5 parts by mass of a clarifying agent represented by the above-described Formula (1) with respect to 100 parts by mass of a polyolefin resin, the polyolefin resin composition having a birefringence ($\Delta n$) in the range of $5.0 \times 10^{-3}$ to $6.0 \times 10^{-3}$ when molded into a 0.5 mm-thick sheet. When the refractive index for light linearly polarized in the orientation direction of the molded article is represented by Nx and the refractive index for light linearly polarized in the direction perpendicular to the orientation direction is represented by Ny, the birefringence ($\Delta n$) is expressed by the following equation:

$$\Delta n = |Nx - Ny|$$

The method of molding the polyolefin resin composition is not particularly restricted and the polyolefin resin composition can be molded by a known method. The polyolefin resin composition can be molded by, for example, extrusion molding, injection molding, hollow molding, blow molding or compression molding. Further, examples of the shape of the transparent material include those of bottles, sheets, films and packaging materials.

Preferred clarifying agents that are represented by the above-described Formula (1) and specific examples thereof include the same ones as those exemplified for the above-described embodiment of the clarifying agent composition. Also, specific examples of the polyolefin resin used in the polyolefin resin composition include the same ones as those exemplified above.

In the present invention, it is preferred that the above-described polyolefin resin composition further contain a fatty acid metal salt, particularly a fatty acid lithium salt, a fatty acid magnesium salt, a fatty acid calcium salt, a fatty acid sodium salt or the like, because this allows the effects of the present invention to be prominently exhibited. In cases where the above-described fatty acid metal salt is added as a dispersant of the clarifying agent, the fatty acid metal salt is preferably used in the range of 1 to 100 parts by mass with respect to 100 parts by mass of the clarifying agent.

Further, in the present invention, it is preferred that the above-described polyolefin resin composition further contain a filler because the physical properties of the resulting molded article can be thereby improved. As the filler, a known compound can be used without any particular restriction, and examples of preferred filler include talc, mica, calcium carbonate, calcium oxide, calcium hydroxide, magnesium carbonate, magnesium hydroxide, magnesium oxide, magnesium sulfate, aluminum hydroxide, barium sulfate, glass powders, glass fibers, clays, dolomite, silica, alumina, potassium titanate whiskers, wollastonite and fibrous magnesium oxysulfate. Among these fillers, those having an average particle size (in the case of spherical or plate-form fillers) or an average fiber diameter (in the case of needle-form or fibrous fillers) of 5 µm or less are preferred.

In the present invention, as required, other conventionally known additive(s) may also be added to the polyolefin resin composition, as long as the amount thereof is in such a range that does not impair the effects of the present invention. Examples of such other additives include the same ones as those exemplified for the above-described embodiment of the clarifying agent composition.

A colorant is used for adjusting the color of the resulting molded article. As the colorant, a known compound can be used without any particular restriction; however, a blue colorant is preferably used since it improves the transparency. Examples of the blue colorant include inorganic materials, such as azurite blue, iron blue, cobalt blue, cerulean blue, inorganic synthetic ultramarine, Prussian blue, and the like; and organic materials such as phthalocyanine-based pigments (e.g., phthalocyanine blue), indanthrene blue, alkali blue lake, and the like.

In the clarifying agent composition of the present invention, in order to improve the dispersion of the above-described colorant, a dispersant such as a metallic soap or polyethylene wax can be used. Examples of the metallic soap include magnesium palmitate, calcium oleate, copper oleate, lithium stearate, magnesium stearate, zinc stearate and calcium stearate. Further, as polyethylene wax, a variety of polyethylene waxes such as general polymerized-type, decomposed-type and modified-type polyethylene waxes can be used.

As the above-described colorant, a colorant coated with amorphous silica, a low-melting-point glass, or a hydroxide, oxide, carbonate, phosphate, silicate or the like of magnesium, calcium, zinc, aluminum, titanium, zirconium, tin, iron or rare earth element such as lanthanum, praseodymium or neodymium can also be used.

Moreover, by using a pigment that is commonly used for coloring conventional plastics, for example, an inorganic pigment such as zinc oxide or titanium oxide or an organic pigment such as a quinacridone-based pigment or dioxazine-based pigment, a molded article produced from the resin composition of the present invention can be adjusted to have a desired color.

The amount of the above-described respective additives to be used in the present invention is preferably in the range of from an amount at which the effects of adding the additive are exerted to an amount at which an improvement in the effects of the addition is no longer observed. Preferred amounts of the respective additives to be used with respect to 100 parts by mass of polyolefin are as follows: 0.1 to 20 parts by mass of plasticizer, 1 to 50 parts by mass of filler, 0.001 to 1 part by mass of surface treatment agent, 0.001 to 10 parts by mass of phenolic antioxidant, 0.001 to 10 parts by mass of phosphorus-based antioxidant, 0.001 to 10 parts by mass of thioether-based antioxidant, 0.001 to 5 parts by mass of ultraviolet absorber, 0.01 to 1 part by mass of hindered amine compound, 1 to 50 parts by mass of flame retardant, 0.03 to 2 parts by mass of lubricant, and 0.03 to 2 parts by mass of antistatic agent. It is noted here that the above-described amounts of use indicate the final amounts of the respective additives used in the transparent material.

The above-described polyolefin resin composition can be molded by a known molding method such as extrusion molding, injection molding, hollow molding, blow molding or compression molding, and molded articles, such as food containers; cosmetic and clothing containers; bottles such as food bottles, beverage bottles, cooking oil bottles and seasoning bottles; packaging materials such as food packaging materials, wrapping materials and transport packaging materials; sheets and films; fibers; miscellaneous daily goods; and toys, can be thereby easily obtained. Further, in such a range that does not impair the effects of the present invention, the polyolefin resin composition may also be blended with glass fibers, carbon fibers and the like to produce fiber-reinforced plastics.

EXAMPLES

The present invention will now be described in more detail by way of examples thereof; however, the present invention is not restricted thereto by any means.

Examples 1-1 to 5, Comparative Examples 1-1 and 2

With respect to 100 parts by mass of an ethylene/propylene random copolymer having a melt flow rate of 8 g/10 min, 0.1 parts by mass of a phenolic antioxidant (tetrakis [methylene-3-(3',5'-di-tert-butyl-4'-hydroxyphenyl)propionate]methane), 0.1 parts by mass of a phosphorus-based antioxidant (tris(2,4-di-tert-butylphenyl)phosphite), 0.05 parts by mass of calcium stearate, a blue pigment (azurite blue: inorganic pigment) in an amount shown in Table 1 and the respective clarifying agent composition shown in Table 1 were mixed for 1 minute using a Henschel mixer (FM200; manufactured by NIPPON COKE & ENGINEERING Co., Ltd.) at 1,000 rpm. Then, using a biaxial extruder (PCM-30; manufactured by Ikegai Corp.), the resulting mixture was extruded at a temperature of 240° C. and a screw speed of 160 rpm to produce a pellet.

The thus obtained pellet was molded at a molding temperature of 200° C. into the form of a 0.5 mm-thick bottle. The bottle-form molded article was then subjected to the following evaluations.

(1) Haze

A test piece was cut out from the bottle-form molded article and the opacity (haze) thereof was determined using a Haze-Gard 2 (manufactured by Toyo Seiki Seisaku-sho, Ltd.).

(2) Yellowness (Y.I.)

A test piece was cut out from the bottle-form molded article and the yellowness thereof was measured using a spectrocolorimeter (SC-T; manufactured by Suga Test Instruments Co., Ltd.).

(3) Transparency

The bottle-form molded article was filled with water and the visibility of characters placed at a distance of 10 cm from the back of the bottle-form molded article was evaluated.

The evaluation was performed based on the following criteria: "x" when the characters were not readable; "Δ" when the characters were readable but their outlines were blur; and "○" when the characters were clearly visible with distinct outlines.

TABLE 1

| | Clarifying agent (Dispersant) | Amount [parts by mass] | Colorant Dispersant | Amount [×10$^{-4}$ parts by mass] | Haze [%] | Y.I. | Transparency |
|---|---|---|---|---|---|---|---|
| Example 1-1 | P-5 | 0.08 | blue pigment | 15 | 47.5 | 7.4 | ○ |
| | Li myristate | 0.02 | Mg stearate | 5 | | | |
| Example 1-2 | P-5 | 0.075 | blue pigment | 15 | 47.3 | 7.5 | ○ |
| | Li myristate | 0.025 | Mg stearate | 5 | | | |
| Example 1-3 | P-5 | 0.055 | blue pigment | 15 | 48.3 | 7.7 | ○ |
| | Li myristate | 0.045 | Mg stearate | 5 | | | |
| Example 1-4 | P-5 | 0.055 | blue pigment | 18 | 48.3 | 7.9 | ○ |
| | Li myristate | 0.045 | Mg stearate | 2 | | | |
| Example 1-5 | P-2 | 0.1 | blue pigment | 15 | 42.9 | 8.4 | ○ |
| | | | Mg stearate | 5 | | | |

TABLE 1-continued

|  | Clarifying agent (Dispersant) | Amount [parts by mass] | Colorant Dispersant | Amount [×10⁻⁴ parts by mass] | Haze [%] | Y.I. | Transparency |
|---|---|---|---|---|---|---|---|
| Comparative Example 1-1 | Comparative Compound 1 | 0.20 | blue pigment Mg stearate | 15 8 | 53.4 | 9.9 | Δ |
| Comparative Example 1-2 | P-5 Li myristate | 0.055 0.045 | none | — | 48.4 | 10.2 | ○ |

1) Comparative Compound 1: clarifying agent manufactured by Milliken & Company (trade name: Millad NX-8000)

In Comparative Example 1-1 where a clarifying agent represented by the Formula (1) was not used, a molded article having excellent transparency was not obtained. In addition, from Comparative Example 1-2, it was confirmed that, even with the use of a clarifying agent represented by Formula (1), when no colorant was used, the molded article was markedly colored and its outer appearance was thus affected.

In contrast, from Examples 1-1 to 5 where a clarifying agent represented by the Formula (1) and a colorant were both used, it was confirmed that, even with a smaller amount of clarifying agent than in Comparative Example 1-1, a molded article having excellent transparency with limited coloration can be obtained.

Examples 2-1 to 3, Comparative Examples 2-1 and 2

With respect to 100 parts by mass of an ethylene/propylene random copolymer having a melt flow rate of 8 g/10 min, 0.1 parts by mass of a phenolic antioxidant (tetrakis [methylene-3-(3',5'-di-tert-butyl-4'-hydroxyphenyl)propionate]methane), 0.1 parts by mass of a phosphorus-based antioxidant (tris(2,4-di-tert-butylphenyl)phosphite), 0.05 parts by mass of calcium stearate and the respective clarifying agent composition shown in Table 2 were mixed for 1 minute using a Henschel mixer (FM200; manufactured by NIPPON COKE & ENGINEERING Co., Ltd.) at 1,000 rpm. Then, using a biaxial extruder (PCM-30; manufactured by Ikegai Corp.), the resulting mixture was extruded at a temperature of 240° C. and a screw speed of 160 rpm to produce a pellet.

The thus obtained pellet was molded at a molding temperature of 200° C. into a 0.5 mm-thick plastic bottle. The thus obtained plastic bottle was then subjected to the following evaluations.

(1) Birefringence (Δn)

A sheet-form piece was cut out from the plastic bottle and the refractive index thereof was measured using a retardation measuring apparatus (RETS-100, manufactured by Otsuka Electronics Co., Ltd.) to calculate the birefringence (Δn) by the equation below. In the equation, Nx represents the refractive index for light linearly polarized in the orientation direction of the sheet, and Ny represents the refractive index for light linearly polarized in the direction perpendicular to the orientation direction.

$$\Delta n = |Nx - Ny|$$

(2) Opacity (Haze)

The opacity (haze) of the test piece was determined in the same manner as described above.

(3) Visibility

The bottle-form molded article was filled with water and the visibility of characters placed at a distance of 10 cm from the back of the molded article was evaluated through the water-filled plastic bottle.

The evaluation was performed based on the following criteria: "×" when the characters were not readable; "Δ" when the characters were readable but their outlines were blur; and "○" when the characters were clearly visible with distinct outlines.

TABLE 2

|  | Clarifying agent | Amount [parts by mass] | Birefringence (Δn) | Haze [%] | Visibility |
|---|---|---|---|---|---|
| Example 2-1 | P-5 Li myristate | 0.08 0.02 | 5.91 × 10⁻³ | 48.4 | ○ |
| Example 2-2 | P-5 Li myristate | 0.06 0.04 | 5.71 × 10⁻³ | 48.4 | ○ |
| Example 2-3 | P-5 Li myristate | 0.04 0.06 | 5.51 × 10⁻³ | 49.4 | ○ |
| Comparative Example 2-1 | Control | — | 7.35 × 10⁻³ | 79.5 | × |
| Comparative Example 2-2 | Comparative Compound 1 | 0.17 | 6.79 × 10⁻³ | 63.5 | Δ |

1) Control: containing no clarifying agent
2) Comparative Compound 1: 1,3: 2,4-bis-o-(3,4-dimethylbenzylidene)-D-sorbitol From Comparative Examples 2-1 and 2, it was confirmed that, without the use of a clarifying agent represented by the Formula (1), a plastic bottle having satisfactory transparency and character visibility cannot be obtained. In contrast, those plastic bottles of Examples 2-1 to 2-3, which contained the clarifying agent represented by the Formula (1) and had a birefringence in the prescribed range, had excellent transparence despite the amount of the added clarifying agent was smaller than that in Comparative Example 2-2.

The invention claimed is:

1. A resin composition, characterized by comprising:
   0.04 to 0.5 parts by mass of a clarifying agent represented by the following Formula (1) with respect to 100 parts by mass of an α-polyolefin resin; and
   1.3 to 10 parts by mass of a colorant with respect to 100 parts by mass of said clarifying agent:

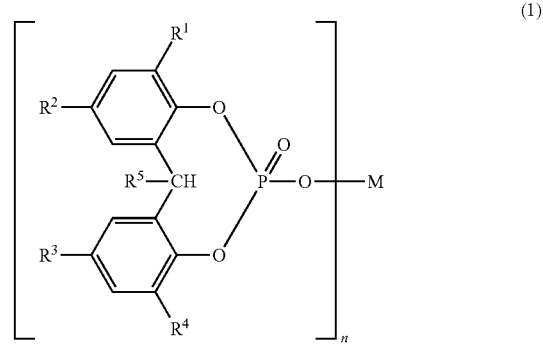

wherein, R1 to R4 each independently represent tert-butyl; R5 represents a hydrogen atom or a methyl group; n represents 1 or 2; and M represents an alkali metal when n is 1, or Al(OH) when n is 2, wherein the colorant is a blue pigment, and wherein the α-polyolefin resin is one or more selected from the group consisting of low-density polyethylenes, linear low-density polyethylenes, high-density polyethylenes, isotactic polypropylenes, syndiotactic polypropylenes, hemi-isotactic polypropylenes, cycloolefin polymers, stereo block polypropylenes, poly-3-methyl-1-butene, poly-3-methyl-1-pentene and poly-4-methyl-1-pentene, ethylene/propylene block copolymers, random ethylene/propylene copolymers, and mixtures thereof.

2. A molded article, characterized by being obtained by molding the resin composition according to claim 1.

3. The molded article according to claim 2, wherein said molded article is transparent.

4. A method of producing a transparent material, said method being characterized by comprising the step of molding a resin composition according to claim 1 that has a birefringence (Δn) in a range of $5.0 \times 10^{-3}$ to $6.0 \times 10^{-3}$ when molded into a 0.5 mm thick sheet.

5. The method of producing a transparent material according to claim 4, wherein said α-polyolefin resin is an ethylene-propylene random copolymer having a melt flow rate of 0.1 to 30 g/10 min.

6. The method of producing a transparent material according to claim 4, wherein said α-polyolefin resin composition further comprises a fatty acid metal salt or a filler.

* * * * *